(No Model.)
M. C. YARWOOD.
VEHICLE WHEEL.
No. 515,392. Patented Feb. 27, 1894.
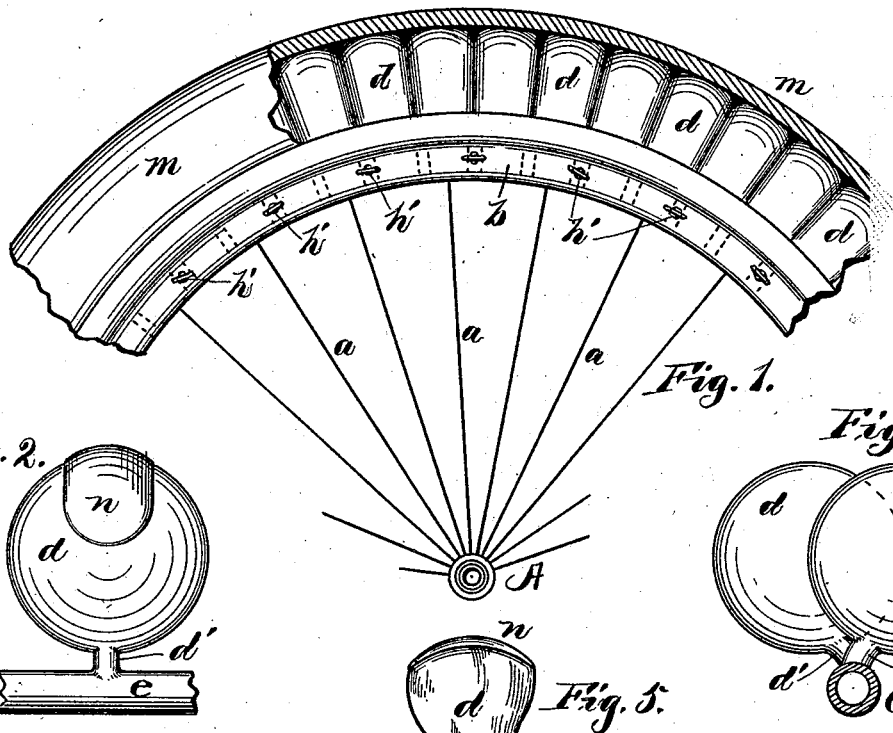
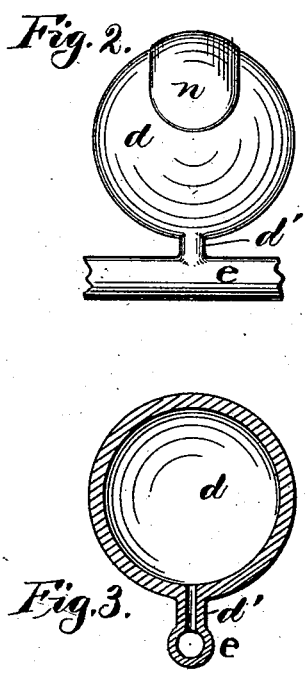
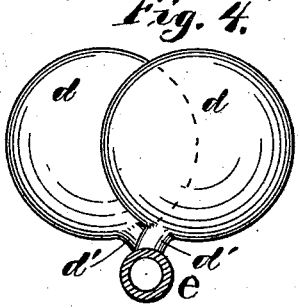
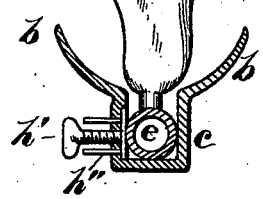
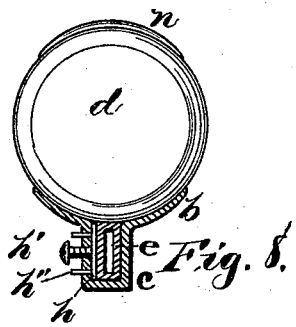
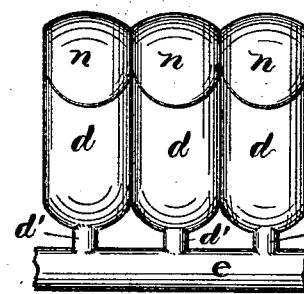
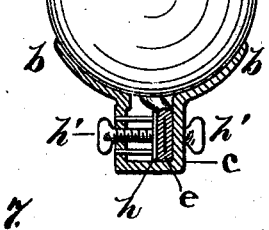
WITNESSES:
H. A. Carhart
C. B. Kinne
INVENTOR.
Matthew C. Yarwood.
BY
Smith & Denison
ATTORNEYS.
THE NATIONAL LITHOGRAPHING COMPANY,
WASHINGTON, D. C.

UNITED STATES PATENT OFFICE.

MATTHEW C. YARWOOD, OF SYRACUSE, NEW YORK.

VEHICLE-WHEEL.

SPECIFICATION forming part of Letters Patent No. 515,392, dated February 27, 1894.

Application filed June 4, 1892. Serial No. 435,534. (No model.)

*To all whom it may concern:*

Be it known that I, MATTHEW C. YARWOOD, of Syracuse, in the county of Onondaga, in the State of New York, have invented new and useful Improvements in Vehicle-Wheels, of which the following, taken in connection with the accompanying drawings, is a full, clear, and exact description.

My invention relates to vehicle tires, and particularly to that class known as "pneumatic tires," and to the sub-class thereof which is composed of a series of connected air chambers within an inclosing outer casing, which is the wearing surface of the tire.

My object is to provide a vehicle wheel with a tire consisting of a series of balls of rubber or other flexible material, each having a separate tubular connection to a tube located in the rim of the wheel, and an outer casing inclosing said balls or spheres, said balls being closely contiguous to each other and adapted to be flattened laterally when inflated through said tube and connections, so that whenever a ball is punctured, the condensing compression of the rubber, will automatically close the puncture and heal it, and still maintain, and preserve the air pressure with the ball; and means are provided for closing the connection, or shutting it off between the balls.

My invention consists in the several novel features of construction and operation, hereinafter described and which are specifically set forth in the claims hereunto annexed. It is constructed as follows, reference being had to the accompanying drawings, in which—

Figure 1, is an elevation of part of a wheel, in which the balls are primarily connected to a tube which is within the felly. Fig. 2, is an elevation of a single ball (not flattened) connected to the tube. Fig. 3, is a vertical section on a line diametrical to the ball, and its connecting stem, and transverse to the tube, omitting the cap, shown in Fig. 2. Fig. 4, is a sectional elevation of two balls, their stems, and the tube showing the normal position of the balls, before they are flattened or collapsed. Fig. 5, is a sectional elevation of the felly, tube and ball connected to it, as shown in Fig. 1, said ball being collapsed by the exhaustion of the air from it. Fig. 6, is a like view of the same parts, shown in Fig. 5, with the ball expanded and the connecting tube closed. Fig. 7, is a side elevation of three of the balls connected to a tube, and flattened by their lateral contact with each other. Fig. 8, is a like view of the same parts shown in Fig. 6, except that the tube is rectangular in cross-section. Fig. 9, is a side elevation of three flattened balls, connected to the rectangular tube.

A, is the hub of a wheel, and —a—a— are the spokes connected to it and to the felly or rim —b— in the usual manner, said felly being provided with a channel —c— opening outward through the bottom of its concavity. The spherical balls —d— are each connected by a stem —d'— to a tube —e— which is common to all of the balls, and provided with some ordinary appliance (not shown) whereby the air can be simultaneously exhausted from all of the balls, through said tube and said stems, and can be again forced into them after the collapsed balls are placed in alignment as shown in Figs. 7, and 9 in side elevation.

In Figs. 5 and 8, I show the tube —e— in the channel —c— and adapted to be compressed and flattened as shown in Fig. 6, by the plate —h— within the channel, and the set-screw —h'— through a wall thereof, either with or without the use of guide pins —h"— connected to the plate and passing loosely through the channel wall, whereby not only is the air in the tube forced into the balls, but the balls are entirely disconnected from each other. In Figs. 8 and 9 the tube is shown as rectangular in cross-section.

The balls are inclosed within a sack, shoe or other suitable covering m. The effect of this lateral compression of the balls is to compress or condense the rubber within the periphery, so that even if one of them is punctured, the resiliency of the rubber increased by its compression, will automatically and instantly close and heal the wound, without injuriously affecting or reducing the air pressure within it.

It will be seen that my tire is really composed of spherical balls tubularly connected to a tube common to all of them, and flattened by their lateral pressure against each other when inflated, each of which is a reservoir or chamber for compressed air, and that all are self-healing when punctured; that even if one ball loses its air pressure, its natural elasticity remains; and that the balls being so flattened in case one loses all its pressure and collapses, the joint action of the adjoining balls, reinforced by that of all of the others, will absolutely flatten the collapsed ball, fill its space and take its place in the tire, my practice being to compress the balls to a width equal to about one half of their natural diameter.

I am aware that independent chambers containing air in natural or normal condition, have heretofore been inserted into a sack to create a tire, but I am not aware that such air chambers have heretofore been compressed therein by their lateral pressure against each other, whereby each was converted into an independent compressed air chamber so that said chambers are self-healing, or adapted by expansion to fill the space of a chamber which has collapsed.

What I claim as my invention, and desire to secure by Letters Patent, is—

1. A vehicle tire composed of a tube, and hollow spheres, each having a separate tubular connection to said tube, and adapted to be laterally flattened by their pressure against each other when inflated through said tube and connection.

2. A vehicle tire composed of a tube, and hollow spheres, each having a separate tubular connection to said tube, and laterally flattened by their pressure against each other when inflated, in combination, with a wheel felly, and a casing secured thereto, and inclosing said spheres.

3. A vehicle tire composed of a tube, hollow spheres connected thereto and closely contiguous to each other, and means to exhaust the air from them and to refill them with compressed air when placed in proper alignment; in combination, as set forth.

4. A vehicle tire composed of a tube, hollow spheres, connected thereto and closely contiguous to each other, and means to exhaust the air from them and to refill them with compressed air, when placed in alignment, a felly adapted to receive said tube, and means to compress said tube and disconnect said spheres from each other in combination.

5. The combination with a wheel rim, and a tire casing of separate inflatable sections contained within the casing, and a tube located in the rim and having a separate connection with each inflatable section.

In witness whereof I have hereunto set my hand this 1st day of June, 1892.

MATTHEW C. YARWOOD.

In presence of—
C. W. SMITH,
HOWARD P. DENISON.